United States Patent
Godfrey et al.

(10) Patent No.: US 8,825,089 B2
(45) Date of Patent: Sep. 2, 2014

(54) SYSTEMS AND METHODS FOR TRACKING AND MONITORING AN ELECTRONIC DEVICE

(75) Inventors: Matthew R. Godfrey, Ogden, UT (US); Timothy A. Tabor, West Jordan, UT (US)

(73) Assignee: Matthew R. Godfrey, Ogden, UT (US)

( * ) Notice: Subject to any disclaimer, the term of this patent is extended or adjusted under 35 U.S.C. 154(b) by 0 days.

(21) Appl. No.: 13/544,373

(22) Filed: Jul. 9, 2012

(65) Prior Publication Data

US 2013/0016009 A1  Jan. 17, 2013

Related U.S. Application Data

(60) Provisional application No. 61/505,929, filed on Jul. 8, 2011.

(51) Int. Cl.
*H04W 24/00* (2009.01)
*G01S 19/49* (2010.01)
*G01S 19/34* (2010.01)
*G01S 5/00* (2006.01)

(52) U.S. Cl.
CPC ............... *G01S 19/34* (2013.01); *G01S 19/49* (2013.01); *G01S 5/0027* (2013.01)
USPC ............... 455/456.6; 455/456.1; 455/414.3; 455/441; 455/418; 342/357.31

(58) Field of Classification Search
USPC ......... 455/456.1–457, 418–420, 414.1–414.3
See application file for complete search history.

(56) References Cited

U.S. PATENT DOCUMENTS

| | | | | |
|---|---|---|---|---|
| 5,223,844 A | * | 6/1993 | Mansell et al. | 342/357.31 |
| 5,731,757 A | | 3/1998 | Layson, Jr. | |
| 6,396,843 B1 | * | 5/2002 | Chiussi et al. | 370/418 |
| 6,684,078 B1 | * | 1/2004 | Park | 455/456.1 |
| 7,463,896 B2 | * | 12/2008 | Himmelstein | 455/456.1 |
| 8,483,710 B2 | * | 7/2013 | Casey et al. | 455/456.1 |
| 2002/0090955 A1 | * | 7/2002 | Nelson et al. | 455/456 |

(Continued)

FOREIGN PATENT DOCUMENTS

KR  1020090036924 A   4/2009

OTHER PUBLICATIONS

Notification of Transmittal of the International Search Report and the Written Opinion of the International Searching Authority, or the Declaration, dated Jan. 29, 2013, for PCT/US2012/045939, filed Jul. 9, 2012.

*Primary Examiner* — Sharad Rampuria
(74) *Attorney, Agent, or Firm* — Stoel Rives LLP

(57) ABSTRACT

An electronic tracking device includes a processor in communication with a global positioning system (GPS) device, a motion tracking unit, a data storage unit, and one or more communication devices. The GPS device receives GPS signals, if available, and generates GPS data corresponding to a location of the electronic device. The motion tracking unit generates motion data based on movement of the electronic device. The data storage device stores the GPS data and the motion data at a plurality of different times. The processor generates a data packet including the GPS data and the motion data stored in the data storage device at the plurality of different times. The one or more communication devices transmit the data packet to a remote server for monitoring the location of the electronic device based on at least one of the GPS data and the motion data.

11 Claims, 3 Drawing Sheets

(56) References Cited

U.S. PATENT DOCUMENTS

| | | |
|---|---|---|
| 2002/0177476 A1 | 11/2002 | Chou |
| 2005/0033515 A1* | 2/2005 | Bozzone .................. 701/214 |
| 2009/0109040 A1* | 4/2009 | MacLean et al. ............ 340/600 |
| 2009/0258649 A1* | 10/2009 | Salowey .................. 455/435.2 |
| 2010/0045482 A1* | 2/2010 | Strauss ..................... 340/903 |
| 2010/0214216 A1* | 8/2010 | Nasiri et al. ................ 345/158 |
| 2011/0306357 A1* | 12/2011 | Alizadeh-Shabdiz et al. ........................ 455/456.1 |

* cited by examiner

SYSTEMS AND METHODS FOR TRACKING AND MONITORING AN ELECTRONIC DEVICE

RELATED APPLICATION

This application claims the benefit under 35 U.S.C. §119(e) of U.S. Provisional Patent Application No. 61/505,929, filed Jul. 8, 2011, which is hereby incorporated by reference herein in its entirety.

TECHNICAL FIELD

This disclosure relates to systems, methods, and computer program products related to the tracking and monitoring of an electronic device.

BACKGROUND INFORMATION

Tracking and monitoring of an electronic device is becoming more popular. For example, an electronic device may be tracked and/or monitored for covert surveillance or security purposes. Users currently use several COTS (Commercial Off The Shelf) solutions to combine technologies to perform the tracking and monitoring function.

SUMMARY OF THE DISCLOSURE

In one embodiment, an electronic tracking device includes a processor in communication with a global positioning system (GPS) device, a motion tracking unit, a data storage unit, and one or more communication devices. The GPS device receives GPS signals, if available, and generates GPS data corresponding to a location of the electronic device. The motion tracking unit generates motion data based on movement of the electronic device. The data storage device stores the GPS data and the motion data at a plurality of different times. The processor generates a data packet including the GPS data and the motion data stored in the data storage device at the plurality of different times. The one or more communication devices transmit the data packet to a remote server for monitoring the location of the electronic device based on at least one of the GPS data and the motion data.

In certain embodiments, the one or more communication devices include a first radio to communicate the data packet to the remote server through a cellular communication network, and a second radio configured to communicate the data packet to the remote server through at least one of a wireless access point using a standard communication protocol and a dedicated radio frequency (RF) receiver. The processor is configured to communicate the data packet using the second radio upon determining that the first radio is unavailable.

In certain embodiments, the processor is configured to trigger the electronic tracking device to generate the GPS data and the motion data at a first predetermined interval, and to trigger the one or more communication devices to transmit the data packet at a second predetermined interval. The first predetermined interval may be different than the second predetermined interval.

In certain embodiments, the electronic tracking device further includes an electronic sensor unit in communication with the processor to trigger the electronic tracking device to generate the GPS data and the motion data. The electronic sensor unit may further be configured to trigger the one or more communication devices to transmit the data packet. The electronic sensor unit may include one or more devices selected from a group including a motion sensor, a proximity sensor, a video camera, an audio detector, an accelerometer, and an electronic compass.

In certain embodiments, the motion tracking unit includes an electronic compass to generate directional compass data of the electronic device, and an accelerometer to generate spatial orientation data and acceleration data based on the movement of the electronic device. In certain such embodiments, the data packet includes the GPS data that is available for any of the plurality of different times, the directional compass data for each of the plurality of different times, the spatial orientation data for each of the plurality of different times, and a time stamp corresponding to each of the plurality of different times.

In certain embodiments, the data storage device includes one or more ring buffers to store the GPS data and the motion data at the plurality of different times, and to replace oldest data in the one or more ring buffers with new data. The one or more ring buffers may include a first ring buffer for storing the GPS data and a second ring buffer for storing the motion data. The oldest GPS data in the first ring buffer is replaced by new GPS data, and the oldest motion data in the second ring buffer is replaced by new motion data. However, to preserve the more accurate GPS data, the GPS data in the first ring buffer is not replaced by the new motion data.

In another embodiment, a method for tracking an electronic device includes receiving GPS signals, if available, at a plurality of different times. For each of the plurality of different times when the GPS signals are available, the method generates GPS data. For each of the plurality of different times, the method generates motion data based on movement of the electronic device. The method also includes generating a data packet including the generated GPS data, the motion data, and a time stamp corresponding to each of the plurality of different times. The method further includes transmitting the data packet to a remote server for monitoring the location of the electronic device based on at least one of the GPS data and the motion data.

In certain embodiments, transmitting the data packet includes determining whether a cellular communication network is available for communication. If the cellular communication network is available, the method includes transmitting the data packet through the cellular communication network. If the cellular communication network is not available, however, the method includes transmitting the data packet through a wireless access point using a standard communication protocol and a dedicated radio frequency (RF) receiver. The standard communication protocol may include, for example, WiFi or Bluetooth.

In certain embodiments, the method includes detecting a trigger event. In response to the trigger event, the method performs at least one of generating the GPS data, generating the motion data, and transmitting the packet data. The trigger event may be selected from a group comprising expiration of a predetermined time period, receiving a signal from a motion sensor, receiving a signal from a proximity sensor, receiving a signal from a video camera, receiving a signal from an audio detector, receiving a signal from an accelerometer, and receiving a signal from an electronic compass.

In certain embodiments, generating the motion data includes generating directional compass data corresponding to a geographical orientation of the electronic device, and generating relative spatial orientation data and acceleration data based on the movement of the electronic device.

In another embodiment, a method for monitoring a tracking device includes receiving, at a server, a data packet from the tracking device. The data packet includes GPS data, if available, corresponding to a location of the tracking device at a plurality of different times, motion data based on sensed movement of the tracking device at each of the plurality of different times, and time stamps corresponding to each of the plurality of different times. The method further includes determining whether the data packet includes current GPS data for a most recent of the plurality of different times. If the data packet includes the current GPS data, the method applies the current GPS data to geographic map data to display a location on a map corresponding to the tracking device. If, on the other hand, the data packet does not include the current GPS data, the method processes the motion data based on a previously known location of the tracking device to estimate the location of the tracking device.

In certain embodiments, if the data packet does not include the current GPS data, the method applies the estimated location to the geographic map data to display the estimated location on the map, and displays an estimate of an error corresponding to the estimated location. The motion data may include directional compass data corresponding to a geographical orientation of the tracking device, and relative spatial orientation data and acceleration data based on the movement of the tracking device. In certain such embodiments, processing the motion data based on the previously known location of the tracking device to estimate the location of the tracking device may include processing cellular tower location information from a plurality of cellular communication network towers to triangulate the estimated location. In addition, or in other embodiments, processing the motion data based on the previously known location of the tracking device to estimate the location of the tracking device includes processing the directional compass data, the relative spatial orientation data, the acceleration data, the previously known location of the tracking device, and a relative time since the tracking device was at the previously known location to calculate the estimated location.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION OF PREFERRED EMBODIMENTS

Figure 1:
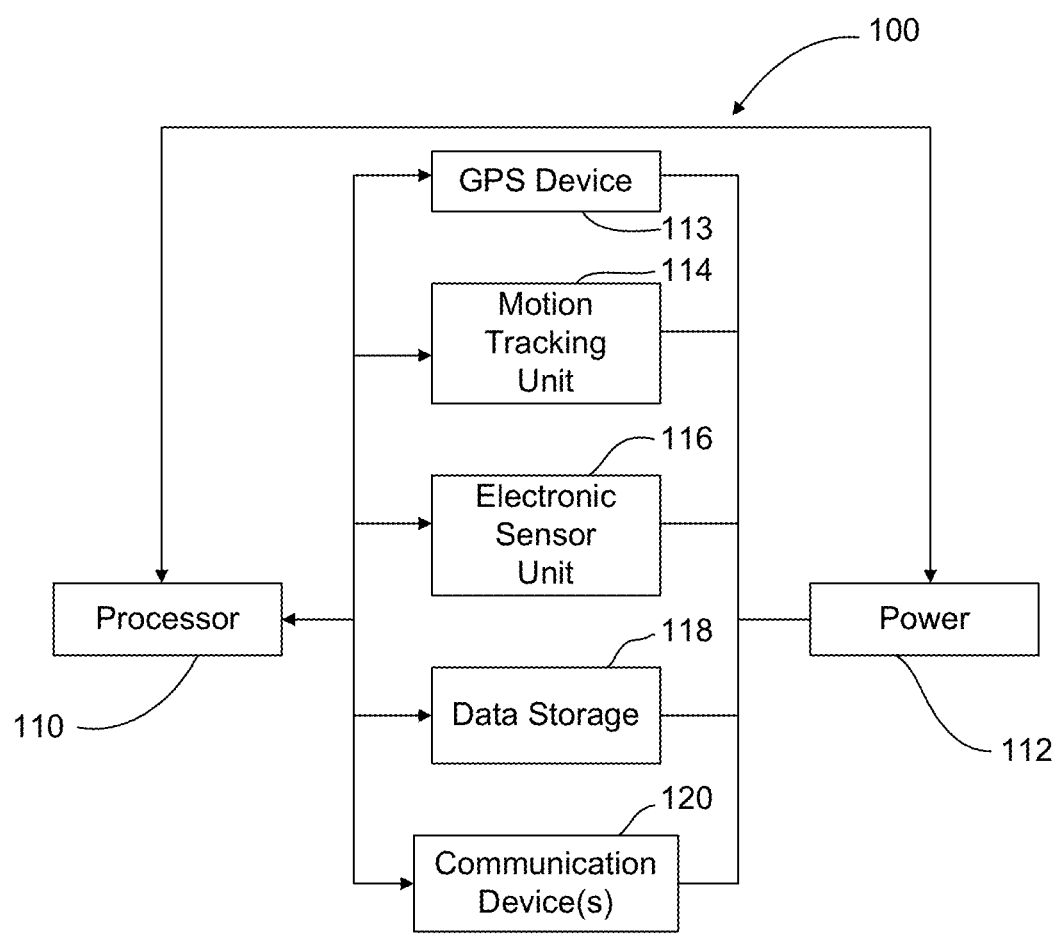
FIG. 1 is a block diagram of an example electronic device that may be tracked and monitored, according to certain embodiments.

Disclosed systems and methods for tracking and monitoring an electronic device include a specific combination of technology and monitoring services. Certain embodiments allow for small packaging and simple deployment and operation.

One embodiment includes a power source, one or more motion tracking devices, one or more electronic sensors, a data storage device, and a communication device.

Using existing backbone communication infrastructures (e.g., cell towers, radio repeaters, WiFi "hot-spots" or access points, or combinations of the foregoing or other communication systems), certain embodiments may easily be deployed with little or no need of building commercial or government infrastructure for operation. In addition, or in other embodiments, one or more radio frequency (RF) receivers may be deployed within a geographical location to receive signals from one or more electronic devices being monitored.

Certain embodiments include a web-based software package that is capable of receiving transmitted data packets from several sources, such as one or more electronic devices being tracked. The web-based software package provides geographical coordinates of the one or more electronic devices that can be displayed as points on a graphical map. Absolute position, trail tracking, current direction, and current speed of the one or more electronic devices can also be derived from the data.

A tracker unit, according to certain embodiments, is configured for covert deployment. The tracker unit can be placed for a period of time and activated by sensor detection, or by periodic interval. Once active, motion tracking readings are sampled and stored. The stored data may be immediately transmitted via a communication link, transmitted at periodic intervals, and/or transmitted when a communication link becomes available.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform processes described herein. In certain embodiments, the machine-readable medium includes a non-transitory medium. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

FIG. 1 is a block diagram of an example tracker unit 100 that may be tracked and monitored according to certain embodiments. The tracker unit 100 includes a processor 110, a power source 112, a global positioning system (GPS) device 113, a motion tracking unit 114, an electronic sensor unit 116, a data storage unit 118, and one or more communication devices 120. The processor 110 may include, for example, general purpose single-chip or multiple-chip microprocessors, digital signal processors, embedded microprocessors, microcontrollers, combinations of the foregoing, or the like.

The power source 112 may include, for example, a battery. In certain embodiments, the battery is a rechargeable battery. In addition, the power source 112 may include one or more devices for recharging the battery during use. For example, the power source 112 may include solar cells and circuitry for converting sunlight into electricity for charging the battery. In addition, or in other embodiments, the power source 112 may include a connector and power conversion circuitry for charging the battery from an electrical outlet (e.g., a 120V wall outlet or through a USB connection).

The motion tracking unit 114 includes one or more devices for generating data used to determine the geographic location of the tracker unit 100. In one embodiment, the motion tracking unit 114 includes an electronic compass and a 3-axis accelerometer. Data from the motion tracking devices (and, in some embodiments, the GPS device 113) may be superimposed or averaged to increase the accuracy of tracking and monitoring the tracker unit 100. Further, the motion tracking devices provide redundancy that allows for identification of geographic location even when one or more of the signals from these devices is degraded or absent. For example, during operation, the tracker unit 100 may enter a building or geological feature (e.g., a canyon) that prevents the tracker unit 100 from adequately receiving GPS signals from GPS satellites. In such a case, data from the electronic compass and/or the 3-axis accelerometer may continue to be stored and analyzed to continuously track the tracker unit's movement while GPS is unavailable. Without GPS, the accuracy of the tracker unit's geographic location may drift over time. Once the GPS signals are available again, however, the GPS data may be resynchronized with the data from the electronic compass and/or the 3-axis accelerometer. In certain embodiments, extrapolation may be used to correct drift in the motion data that occurs during periods of GPS unavailability.

In certain embodiments, the tracker unit 100 is configured to enter an inactive or "sleep" state to conserve batter power and to periodically awaken to an active state to gather and transmit data. In addition, or in other embodiments, the electronic sensor unit 116 includes one or more devices for triggering the tracker unit 100 to perform a function such as generating data and/or transmitting the data to a remote server. For example, to conserve power and other resources (e.g., memory), the tracker unit 100 may only need to generate and/or transmit data at certain times or under certain conditions. The electronic sensor unit 118 may include a motion sensor, a proximity sensor, a video camera, an audio detector, other triggering or sensing devices, combinations of the foregoing, or the like. Thus, for example, the tracker unit 100 may only store video, still images, and/or audio when the presence of a person is detected by the motion sensor, proximity sensor, or by voice activation. Similarly, the tracker unit 100 may only store location or other data when triggered by the electronic sensor unit 116 or by the motion tracking unit 114 (e.g., the 3-axis accelerometer and/or electronic compass may also trigger the tracker unit 100).

The data storage unit 118 stores data generated by the tracker unit 100. The stored data may include, for example, tracking and motion data, video data, still image data, and/or audio data. In certain embodiments, the data storage unit 118 includes one or more ring buffers configured to store data generated at specified time intervals and/or in response to a trigger event. Because the one or more communication devices 120 may not always be available and/or because data may be transmitted only during certain intervals to conserver power, new data may replace the oldest data in the ring buffers to increase the likelihood of transmitting all data in the ring buffers. Further, because the tracker unit 100 does not receive confirmation that the data has been received by the remote server, in certain embodiments, a full set of data (e.g., the entire contents of the one or more ring buffers) is sent to the remote server every time data is transmitted, even if portions of the data have previously been sent. In addition, or in other embodiments, because GPS data provides more accurate location and tracking information, separate ring buffers are used for GPS data and all other data. Thus, GPS data is not overwritten with data from the accelerometer or digital compass.

The one or more communication devices 120 communicate the data to a remote server or other communication device. The one or more communication devices 120 may be configured to communicate using, for example, USB (universal serial bus), WiFi (IEEE 802.11 standards), GPRS (general packet radio service), CDMA (code division multiple access), 3G (third generation telecommunications standards), 4G (fourth generation telecommunications standards), LTE (long term evolution standard), and/or other wireless or wired communication protocols. In certain embodiments, the one or more communication devices 120 are configured to support multiple infrastructure formats to take advantage of different communication infrastructures. The one or more communication devices 120, for example, may use a plurality of different existing communication channels as it moves from geographic location to location. Data can be sent via, for example, WiFi, SMS messaging, cellular phone, or other public systems. A WiFi or cellular link may be used, for example, to transmit video, still images, and/or audio. SMS text messaging may be used, for example, to send simple messages such as updated GPS, accelerometer, electronic compass, and/or geographic coordinate information.

Figure 2:
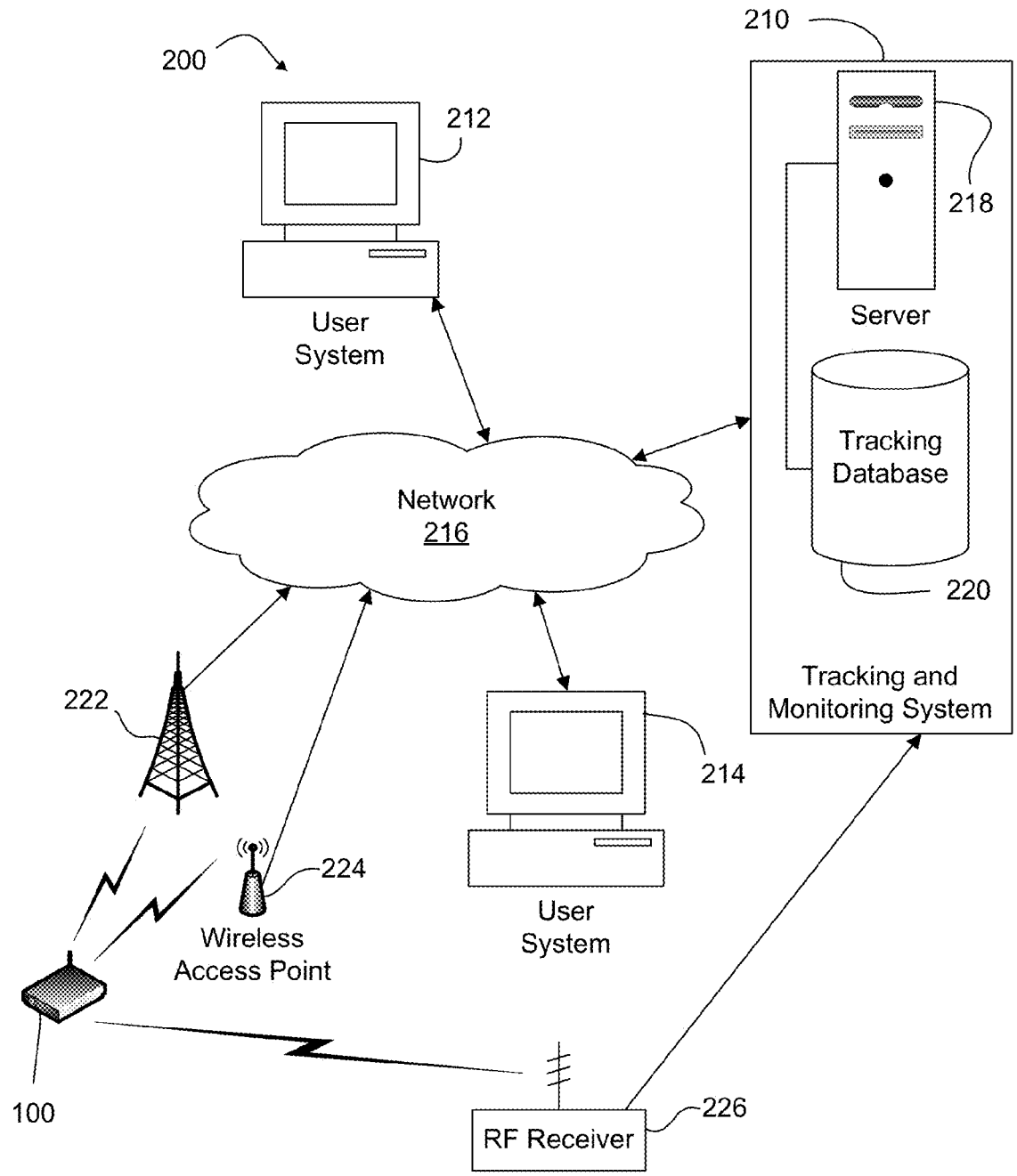
FIG. 2 is a block diagram of an example system for tracking and monitoring electronic devices, such as the electronic device shown in FIG. 1, according to certain embodiments.

FIG. 2 is a block diagram of an example system 200 for tracking and monitoring electronic devices, such as the tracker unit 100 shown in FIG. 1, according to one embodiment. The example system 200 includes a tracking and monitoring system 210 in communication with one or more user systems 212, 214 through a network 216. The illustrated components may be implemented using any suitable combination of hardware, software, and/or firmware.

The network 216 may include, for example, the Internet or World Wide Web, an intranet such as a local area network (LAN) or a wide area network (WAN), a public switched telephone network (PSTN), a cable television network (CATV), or any other network of communicating computerized devices.

The tracking and monitoring system 210 includes a server 218 and a tracking database 220. An artisan will recognize from the disclosure herein that the server 218 and the tracking database 220 can be implemented on one or more computers. Further, the user systems 212, 1214 may include computers to communicate through the network 216. These computers may be single-processor or multiprocessor machines and may include memory having software modules or coded instructions for performing the processes described herein. In certain embodiments, the user systems 212, 214 include mobile devices such as laptops, tablets, and/or smart phones.

In the example shown in FIG. 2, the tracker unit 100 described above in relation to FIG. 1 wirelessly communicates with the tracking and monitoring system 210 through a cellular base station 222 and the network 216. As discussed below, certain embodiments also provide communication through a wireless access point 224 (e.g., using WiFi or Bluetooth standard) and/or an RF receiver 226. The server 218 receives the motion tracking data and other data (e.g., video data, still image data, and audio data) and stores the data in the tracking database 220. In certain embodiments, the server 218 processes data from the GPS, electronic compass, and/or accelerometer (discussed above) to create a virtual world surrounding the location of the tracker unit 100. The server 210 may, for example, provide a display of location points on a 2-dimensional or 3-dimensional map, absolute position data, trail tracking information, direction information, speed information, and other details (e.g., times of day with respect to geographic locations, or audio and/or video with respect to geographic location).

The server 218 is accessible by the user systems 212, 214. Thus, a user such as a government agency or private investigator may access the data provided by the server 218. In one embodiment, the users of the user systems 212, 214 are charged per packet of information stored in the tracking database 220 and/or processed by the server 218. In other embodiments, the users are charged based on time usage in a service bureau type structure. In certain embodiments, the server 218 provides a secure, HTML based web page (e.g., accessible by HTML based web browsers, including mobile applications for smart phones) to the user systems 212, 214.

As discussed above, the tracker unit 100 may be configured to communicate with the tracking and monitoring system 210 through a plurality of different communication channels. As shown in FIG. 2, the communication channels may include, for example, the cellular base station 222, the wireless access point 224, and/or the RF receiver 226. Thus, for example, the tracker unit 100 may attempt to communicate through the wireless access point 224 and/or the RF receiver 226 when communication through the cellular base station is not available. When communicating through the cellular base station 222, the server 218 may extract information from headers of received data packets related to the identification and/or location of the cellular base station 222. The server 218 may use the header information to estimate the location of the tracker unit 100. In certain embodiments, the server 218 receives data from a plurality of cellular base stations and uses triangulation or multilateration to estimate a location of the tracker unit.

Like the cellular base station 222, the wireless access point 224 may provide communication with the tracking and monitoring system 210 through the network (e.g., using the WiFi or Bluetooth standard). In certain embodiments, the tracker unit 100 may push data through both secure and unsecure wireless access points to the network. Further, the server 218 may use header information in packets received from the wireless access point 224, alone or in combination with header information in packets received from the cellular base station 222, to estimate the location of the tracker unit 100.

As shown in FIG. 2, the tracking and monitoring system 210 may include one or more dedicated RF receivers 226. Such RF receivers may be distributed throughout a desired monitoring area (e.g., covering a selected neighborhood or city) or at specific monitoring locations (e.g., near particular homes or businesses where a suspect is expected to visit). The tracker unit 100 may encrypt the data communicated to the RF receiver 226. The RF receiver 226 may have a dedicated link (wired or wireless) to the tracking and monitoring system 210. Although not shown in FIG. 2, the RF receiver 226 may also communicate with the tracking and monitoring system 210 through the network 216.

Figure 3:
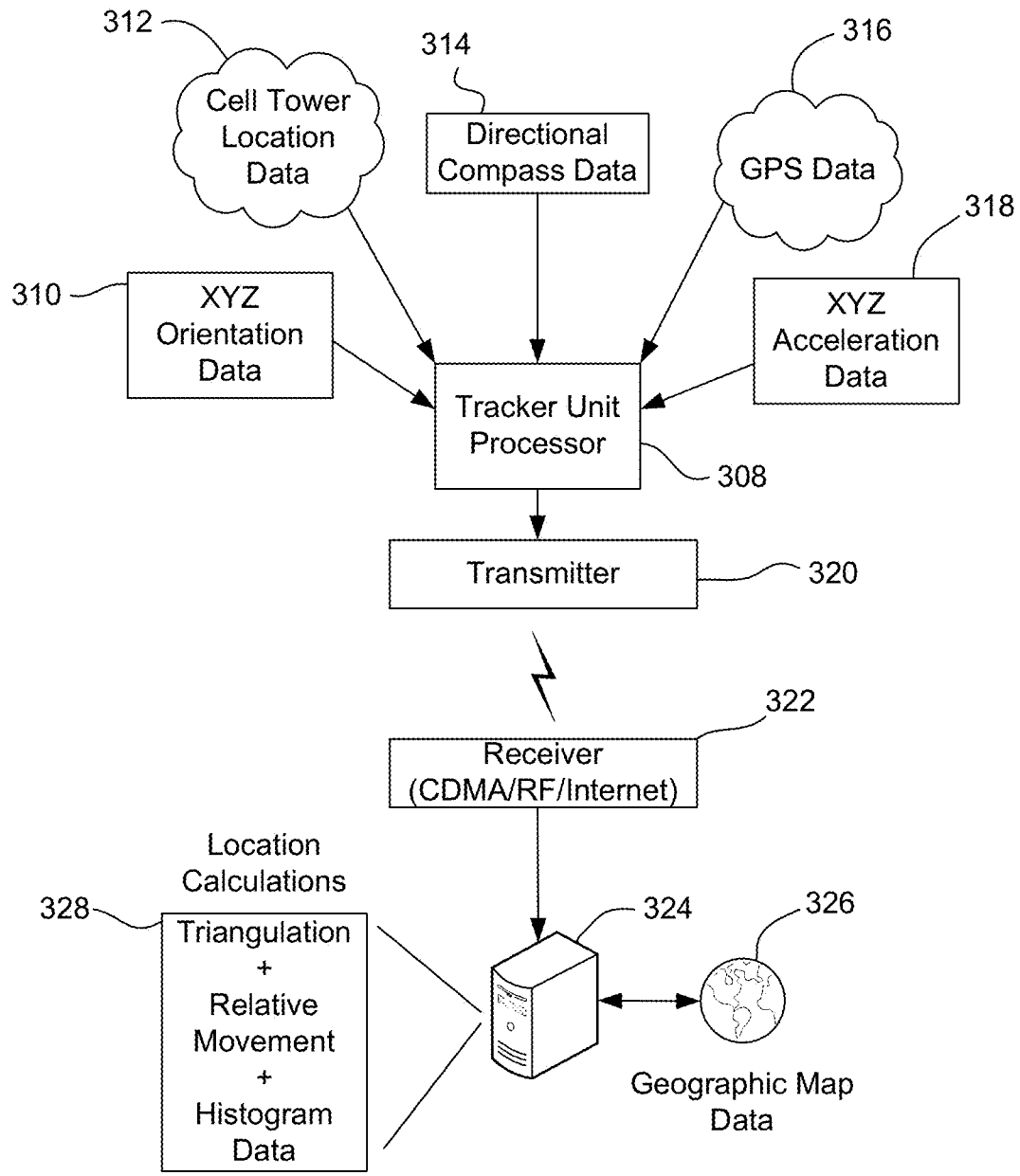
FIG. 3 is a block diagram illustrating data flow for tracking an electronic device according to one embodiment.

FIG. 3 is a block diagram illustrating data flow for tracking an electronic device according to one embodiment. As described above, a tracker unit processor 308 (such as the processor 110 shown in FIG. 1) is configured to receive at least one of XYZ orientation data 310, cell tower location data 312, directional compass data 314, GPS data 316, and XYZ acceleration data 318. In this example, "XYZ" refers to data corresponding to three spatial dimensions. Skilled persons will recognize from the disclosure herein, however, that two dimensional data (e.g., XY orientation data and/or XY acceleration data) may also be used. The tracker unit processor 308 is configured to gather each different type of data (if available), time stamp the data, and record the data as a data packet.

The tracker unit processor 308 provides the data packet to a transmitter 320 (e.g., of the one or more communication devices 120 shown in FIG. 1). The transmitter 320 transmits the data packet using any known communication method (e.g., CDMA SMS (short message service) text message, RF data link, etc.) to a receiver 322. The receiver 322 may be, for example, the cellular base station 222, the wireless access point 224, the RF receiver 226, or any other device in communication with the tracking and monitoring system 210 shown in FIG. 2. The receiver 322 may receive the data packet using, for example, an IP (internet protocol) SMS (text) message, an RF data link, a CDMA radio link, etc.), and provides the data packet to a server 324 (such as the server 218 shown in FIG. 2).

If the received data packet includes the GPS data 316, the server 324 uses the GPS data 316 to determine the location of the tracker unit. In certain embodiments, the server 324 receives geographic map data 326 and applies the GPS data 316 in the received data packet to the geographic map data 326 (e.g., based on longitude and latitude information) to generate a point on a map corresponding to a location of the tracker unit at a time corresponding to a most recent time stamp of the received data packet.

If the received data packet does not include GPS data, however, the server 324 may perform one or more location calculations 328 to estimate the location of the tracker unit or approximate relative movement of the tracker unit from its last known location. For example, the server 324 may use the cell tower location data 312 (from multiple towers) to triangulate a location of the tracker unit. The server 324 may also use the XYZ orientation data 310, the XYZ acceleration data 318, the directional compass data 314 and relative time data between successive data packets to determine approximate relative movement from the last known location. In certain embodiments, locations based on triangulation, approximate relative movement, and histogram data (or other statistical analysis data) of historical locations and/or movements are combined to increase the accuracy (e.g., reduce the error) of the location of the tracker unit. The server 324 may apply the calculated or estimated location of the tracker unit to the geographic map data 326 to generate a point on a map corresponding to an estimated location of the tracker unit at a time corresponding to a most recent time stamp of the received data packet. The server 324 may also display a range of possible locations based on estimated location and an error estimate. For example, if the server 324 determines that the estimated location is accurate within 50 meters, the point on the map may be surrounded by a circle with a radius of 50 meters extending from the point.

In certain embodiments, the server 324 provides a secure website (e.g., accessible by HTML based web browsers, including mobile applications for smart phones) to users such as law enforcement or private investigators. The users may use the secure website to view current and/or historic location information, and to download evidence of the locations and movement of the tracker unit over time. The downloaded evidence may include, for example, the GPS data 316, the estimated locations (e.g., based on the XYZ orientation data 310, cell tower location data 312, directional compass data 314, and XYZ acceleration data 318), and/or the data packets received by the receiver 322.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure. The scope of the present invention should, therefore, be determined only by the following claims.

The invention claimed is:

1. An electronic tracking device for providing evidence including tracking device's locations and movements between geographic locations, the electronic tracking device comprising:
    a processor;
    a global positioning system (GPS) device in communication with the processor; the GPS device to receive GPS signals, if available, and to generate GPS data corresponding to a location of the electronic device from the received GPS signals;
    a motion tracking unit in communication with the processor; the motion tracking unit to generate motion data based on movement of the electronic device;
    at least one of a camera and an audio detector to generate evidence data corresponding to presence of a person during the movements between the geographic locations;
    a data storage device in communication with the processor, the data storage device to store the GPS data, the motion data, and the evidence data at a plurality of different times, wherein the processor is configured to generate a data packet comprising the GPS data, the motion data, and the evidence data stored in the data storage device at the plurality of different times, the data storage device comprising:
        a first ring buffer for storing the GPS data, wherein oldest GPS data in the first ring buffer is replaced by new GPS data; and
        a second ring buffer for storing the motion data, wherein oldest motion data in the second ring buffer is replaced by new motion data, and
        wherein the GPS data in the first ring buffer is not replaced by the new motion data; and
    one or more communication devices in communication with the processor, the one or more communication devices to transmit the data packet to a remote server for evidence collection and monitoring the location of the electronic device based on the GPS data and the motion data.

2. The electronic tracking device of claim 1, wherein the one or more communication devices comprises a first radio to communicate the data packet to the remote server through a cellular communication network.

3. The electronic tracking device of claim 2, wherein the one or more communication devices further comprises a second radio configured to communicate the data packet to the remote server through at least one of a wireless access point using a standard communication protocol and a dedicated radio frequency (RF) receiver.

4. The electronic tracking device of claim 3, wherein the processor is configured to communicate the data packet using the second radio upon determining that the first radio is unavailable.

5. The electronic tracking device of claim 1, wherein the processor is configured to trigger the electronic tracking device to generate the GPS data and the motion data at a first predetermined interval, and wherein the processor is configured to trigger the one or more communication devices to transmit the data packet at a second predetermined interval.

6. The electronic tracking device of claim 5, wherein the first predetermined interval is different than the second predetermined interval.

7. The electronic tracking device of claim 1, further comprising:
    an electronic sensor unit in communication with the processor, the electronic sensor to trigger the electronic tracking device to generate the GPS data and the motion data.

8. The electronic tracking device of claim 7, wherein the electronic sensor unit is further configured to trigger the one or more communication devices to transmit the data packet.

9. The electronic tracking device of claim 7, wherein the electronic sensor unit includes one or more devices selected from a group comprising a motion sensor, a proximity sensor, a video camera, an audio detector, an accelerometer, and an electronic compass.

10. The electronic tracking device of claim 1, wherein the motion tracking unit comprises:
    an electronic compass to generate directional compass data of the electronic device; and
    an accelerometer to generate spatial orientation data and acceleration data based on the movement of the electronic device.

11. The electronic tracking device of claim 10, wherein the data packet comprises:
    the GPS data that is available for any of the plurality of different times;
    the directional compass data for each of the plurality of different times;
    the spatial orientation data for each of the plurality of different times; and
    a time stamp corresponding to each of the plurality of different times.

* * * * *